United States Patent
Hacker et al.

[11] Patent Number: 5,526,735
[45] Date of Patent: Jun. 18, 1996

[54] RAPID COOKING UNITARY PIZZA PAN

[75] Inventors: Terry F. Hacker; Day Z. Muchin, both of Manitowoc, Wis.

[73] Assignee: Anchor Hocking Corporation, Freeport, Ill.

[21] Appl. No.: 416,279

[22] Filed: Apr. 4, 1995

[51] Int. Cl.⁶ .................................. A47J 43/18
[52] U.S. Cl. .................. 99/432; 99/450; 99/DIG. 15
[58] Field of Search ............... 99/432, 450, DIG. 15, 99/426; 220/410, 405, 425, 426; 249/117, 135, 132, 141

[56] References Cited

U.S. PATENT DOCUMENTS

| | | | |
|---|---|---|---|
| 73,703 | 1/1868 | Elder | 99/DIG. 15 |
| 4,367,243 | 1/1983 | Brummett et al. | 99/432 |
| 4,563,946 | 1/1986 | Barlow et al. | 99/DIG. 15 |
| 4,676,151 | 6/1987 | Gorsuch et al. | 99/DIG. 15 |
| 4,785,968 | 11/1988 | Logan et al. | 99/DIG. 15 |
| 4,796,757 | 1/1989 | Strunkmann-Meister | 206/509 |
| 4,865,219 | 9/1989 | Logan et al. | 99/DIG. 15 |
| 4,955,125 | 9/1990 | Steinman | 99/DIG. 15 |
| 5,076,434 | 12/1991 | Hoffman, Jr. | 99/DIG. 15 |
| 5,158,202 | 10/1992 | Kosonen et al. | |
| 5,253,800 | 10/1993 | France | 206/557 |
| 5,323,910 | 6/1994 | va de Graaf, Jr. | 206/557 |

*Primary Examiner*—Timothy F. Simone
*Assistant Examiner*—Reginald L. Alexander
*Attorney, Agent, or Firm*—Baker & McKenzie

[57] ABSTRACT

A unitary pizza pan having a substantially circular bottom, an upwardly raised portion extending outwardly therefrom, a plurality of small apertures formed therethrough and multiple support members which position the bottom of the pan a slight distance above a horizontal surface upon which the pan is placed the combination of these features providing for a crispier crust and a shorter cooking time.

5 Claims, 2 Drawing Sheets

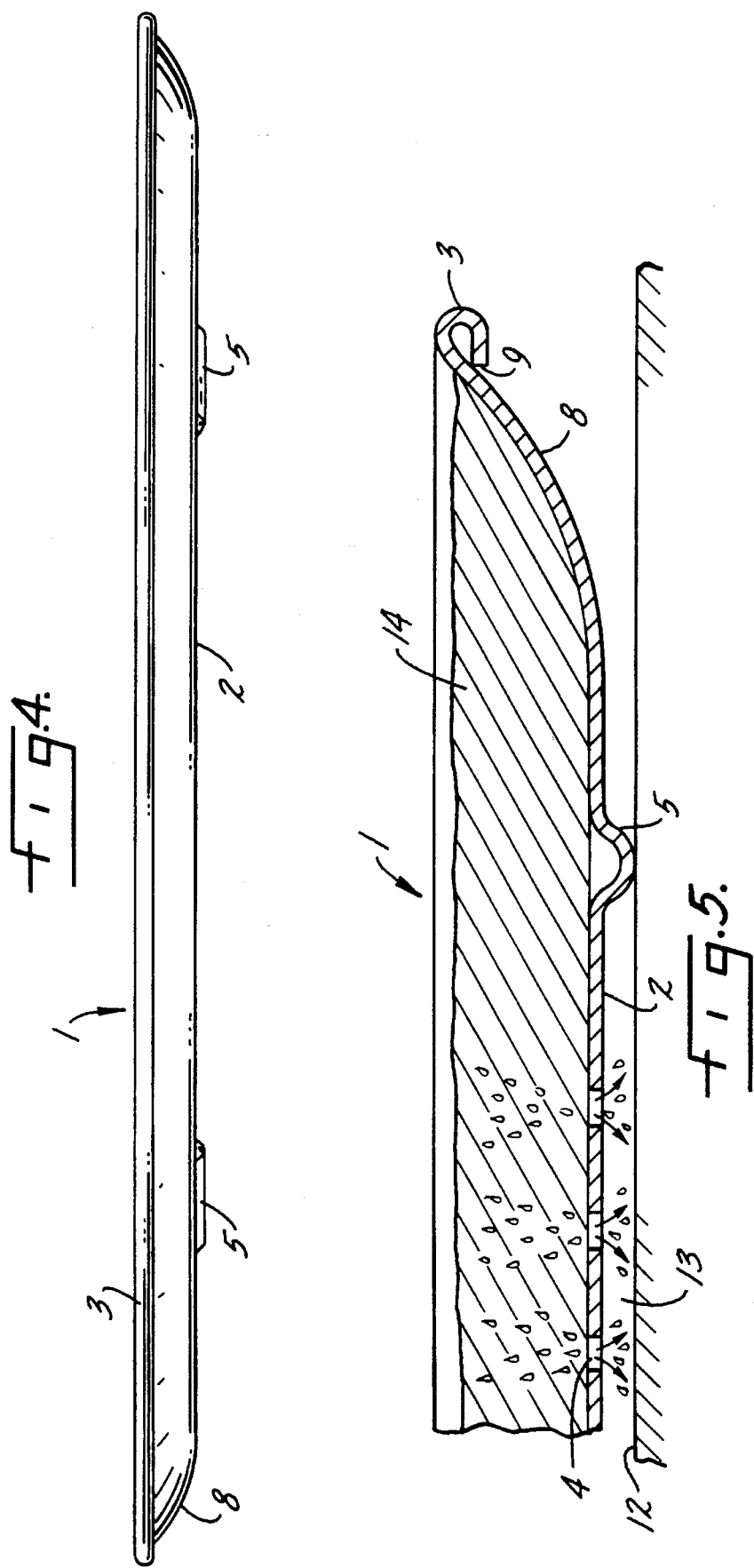

RAPID COOKING UNITARY PIZZA PAN

The present invention relates generally to a pan which is used to cook pizza and, more specifically, to a pizza pan which is designed to cook pizza rapidly and which facilitates the formation of a crispy bottom crust.

BACKGROUND OF THE INVENTION

Pans which are used solely for cooking pizza, either commercially or domestically, are well-known. The great majority of such pans have a relatively flat bottom and some type of upwardly-formed side wall.

Some prior art designs disclose pizza pans which have holes, slots or some other means for allowing moisture to pass down through the pizza pan bottom. These designs are often only marginally effective, however, since the above-described air holes are closed off by the conventional flat cooking surface in the oven and a subsequent flat cutting surface upon which the pan is placed after being removed from the oven.

To alleviate the accumulation of excess steam in a pizza crust, and consequent sogginess, both in an oven and after placement upon a counter top, specially-designed serving platters have been proposed which are capable of receiving pizza pans and which maintain a ventilation space between the bottom of the pizza pan and the bottom of the platter itself. Such platters are disclosed, for example, in U.S. Pat. Nos. 4,785,968 and 4,865,219 to Logan et al. Though these platters represent an improvement over similar products which were known at the time of their development, the present invention represents a further significant improvement over such platters, particularly from the standpoints of conservation of storage space and cost.

SUMMARY OF THE INVENTION

The pizza pan herein disclosed makes possible, for the first time it is believed, the consistent production of a pizza with a crispy bottom crust. Specifically, the crispy bottom crust is obtained by the unique unitary design whereby 1) hot air and moisture are allowed to pass through the bottom of the pan both in the oven and after baking, and 2) the bottom remains a permanently spaced distance from a horizontal cooking or preparation surface upon which the pan is placed.

Specifically, the pizza pan of the present invention has a substantially circular configuration which is formed from a single piece of aluminum or aluminum alloy. The outer perimeter of the pan is upwardly and outwardly sloped and terminates in a small, outwardly and then inwardly rolled edge. In addition, the majority of the pan's surface includes a plurality of apertures which are equally spaced apart and formed within a substantially circular area about the center of the pan. Lastly, the pan includes four downwardly extending support or spacer members which are preferably located between the apertures and the outer perimeter of the pan and which position the bottom surface of the pan a slight distance above the horizontal surface upon which the pan is placed.

Either during or after the process of cooking a pizza, moisture from the bottom of the pizza crust is allowed to pass through the apertures and into the air space which is below the pan yet above the surface upon which the pan is placed. Such design results in a crispier pizza crust. At the same time, hot air from the oven is allowed to come into direct contact with the bottom of the pizza crust, resulting in a shorter cooking time.

BRIEF DESCRIPTION OF THE DRAWING

The invention is illustrated more or less diagrammatically in the accompanying drawing wherein:

FIG. 4 is a side view of the pizza pan; and

FIG. 5 is a side cross-sectional view of the present invention illustrating the position of the pizza pan when placed on a horizontal surface and the function of the apertures.

Figure 1:
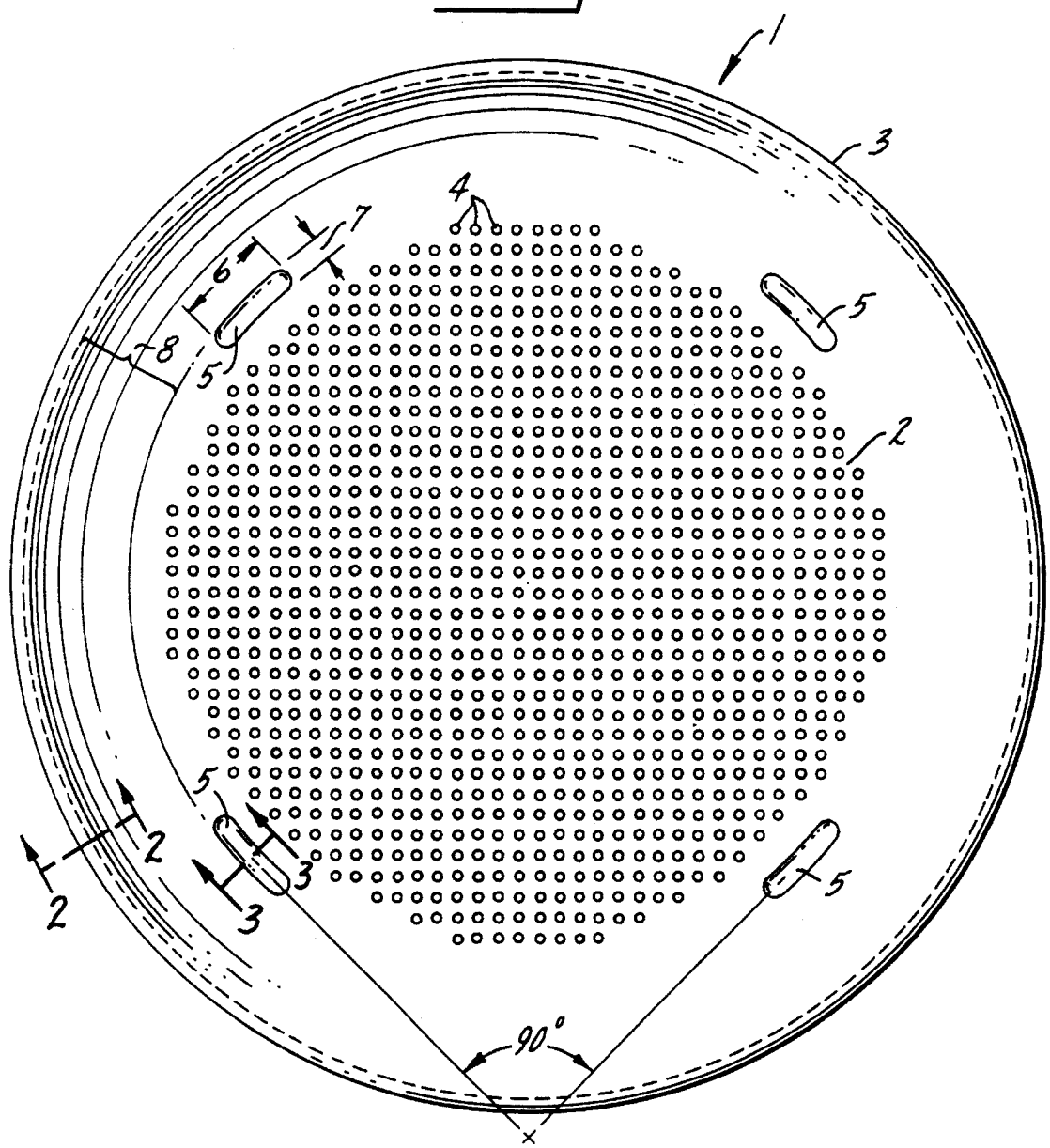
FIG. 1 is a top view of the pizza pan of the present invention.

Notice must be taken that the figures are not necessarily to scale and that the embodiments are sometimes illustrated by phantom lines and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Turning first to FIG. 1, a top view of the pizza pan of the present invention is shown generally at 1. The preferred embodiment of the pizza pan 1 has a substantially circular shape which is defined by its outer edge 3. The bottom is indicated at 2 and is, in this instance, integrally formed with the outer edge 3.

Starting from the outer edge 3 and moving inward, the bottom 2 is comprised of an inwardly and downwardly inclined portion 8, four support members 5 and a plurality of small apertures 4. The apertures 4 are arranged in a substantially circular and grid-like manner about the center of the pizza pan 1. The support members 5 are located at equidistant positions from each other, preferably immediately outward of the substantially circular area occupied by the apertures 4.

Each support member 5 has a width 7 and length 6 which provide excellent stability from a relatively small surface area. As indicated in FIG. 1, each length 6 of a support member 5 is positioned at approximately 90° to an adjacent support member 5. Such relative positioning of the support members 5 further enhances the overall stability of the pizza pan 1.

Figure 2:
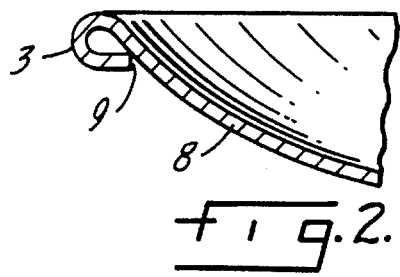
FIG. 2 is a section view taken substantially along line 2—2 of FIG. 1 to an enlarged scale as shown in FIG. 1.

Referring now to FIG. 2, the peripheral portion 8 is, in effect, an upwardly and outwardly formed outermost extension of the bottom 2 and provides a means for retaining the ingredients of a pizza within the boundaries of the pizza pan 1. The peripheral portion 8 terminates in a rolled outer edge 3 whose end 9 is tucked underneath the bottom 2 of the pizza pan 1.

Figure 3:
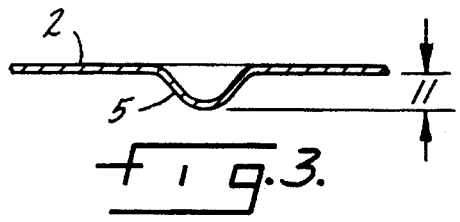
FIG. 3 is a section view taken substantially along line 3—3 of FIG. 1 to an enlarged scale as shown in FIG. 1.

FIG. 3 illustrates that the support member 5 is a downwardly extending portion of the bottom 2, said support member 5 having relatively soft contours and a height 11 of, preferably, approximately ⅛ to ¼ of an inch.

FIG. 4 further illustrates the relatively large bottom 2 and the integrally formed peripheral portion 8 which is, in turn, integrally formed with the rolled outer edge 3. FIG. 4 is viewed from a point which is equidistant from two adjacent support members 5 such that an appreciation may be gained of their elongated shapes and their relative positions on the underside of the bottom 2.

FIG. 5 illustrates a pizza crust 14 placed within the pizza pan 1 whereby it covers the vast majority of the bottom 2 and peripheral portion 8. When the pizza pan 1 is placed upon a horizontal surface 12, either during or after the cooking process, the support members 5 raise the bottom surface 2 of the pizza pan 1 a slight distance above the horizontal surface 12 to create a ventilating space 13.

Conventional, non-aerated pizza pans provide no means for allowing moisture to escape from the bottom of a pizza crust. Even pizza pans with apertures are only partially effective since such apertures become closed off while the pizza pan is placed on a flat cooking surface in an oven or a counter top or some other horizontal surface.

Through the combination of the apertures 4 and support members 5 on the pizza pan 1 of the present invention, excess moisture is allowed to escape through the apertures 4 and into the ventilating space 13 both during and after the cooking process. This combination of features provides the additional benefit of allowing hot air from an oven to pass through the apertures 4 and come into direct contact with the pizza crust 14 in order to cook the pizza in a more rapid manner. Pizzas which are prepared in the pizza pan 1 of the present invention are likely to require less cooking time and will generally have a much crispier bottom crust than pizzas which are prepared in pizza pans known in the prior art.

All of the foregoing features are formed in a one-piece, unitary construction so that raw material and assembly costs, storage requirements and potential future breakage are reduced or eliminated. Indeed, with specific regard to storage, the unique design of the support members 5 allows multiple pizza pans 1 to actually be "nested" within one another as they are stacked.

It should be understood that the above-described embodiment is intended to illustrate, rather than limit, the present invention. Although a single, preferred pizza pan embodiment of the present invention has been illustrated in relative detail, it will become apparent to those skilled in the art that numerous variations and equivalents may be made within the spirit and scope of that which has been expressly disclosed. Accordingly, it is intended that the scope of the invention be limited solely by the scope of the hereafter appended claims and not by the specific wording in the foregoing description.

We claim:

1. A unitary pizza pan comprising:
   (a) a substantially horizontal bottom;
   (b) a plurality of downwardly extending U-shaped support members having a material thickness which is uniform to a material thickness of said bottom, said support members having curved upper edges which are smoothly and integrally formed with said bottom wherein said bottom is maintained in parallel spaced-apart relation to a cooking or cooling surface upon which said pizza pan is placed; and
   (c) means for allowing hot air from an oven to come into direct contact with an underside of a pizza crust placed on said bottom and for allowing moisture from said pizza crust to escape through said underside of said pizza crust.

2. The unitary pizza pan as in claim 1, wherein said means for allowing comprises a plurality of small apertures in said bottom, said apertures contained within a central area slightly smaller than said bottom.

3. The unitary pizza pan as in claim 2, wherein said support members are positioned radially outward of said central area.

4. The unitary pizza pan as in claim 3, wherein said pizza pan further includes an upwardly and outwardly sloped outer portion integrally formed with said bottom and terminating in a rolled edge.

5. A unitary pizza pan comprising:
   (a) a substantially horizontal and circular bottom, said bottom including a plurality of small equally-spaced apertures formed therethrough, said apertures being contained within a substantially circular central area slightly smaller than said bottom;
   (b) a plurality of downwardly extending U-shaped support members having a material thickness which is uniform to a material thickness of said bottom, said support members also having curved upper edges which are smoothly and integrally formed with said bottom, said support members located at substantially equidistant positions from each other and at a radial distance outward of said central area of said bottom, all of said support members having the same vertical height whereby said bottom is maintained in parallel spaced-apart relation to a cooking or cooling surface upon which said pizza pan is placed; and
   (c) an upwardly and outwardly sloped outer portion, said outer portion being integrally formed with said bottom at a point outward of said radial distance associated with said support members, said outer wall having an upper end terminating in a rolled edge.

* * * * *

UNITED STATES PATENT AND TRADEMARK OFFICE
CERTIFICATE OF CORRECTION

PATENT NO. : 5,526,735
DATED : June 18, 1996
INVENTOR(S) : Terry F. Hacker and Jay Z. Muchin It is certified that error appears in the above-indentified patent and that said Letters Patent is hereby corrected as shown below:

On the title page, item [75]:

Please replace the inventor's name, "Day Z. Muchin" with --Jay Z. Muchin-- in the first column of the first page.

Signed and Sealed this

Fifteenth Day of July, 1997

Attest:

*Attesting Officer*

BRUCE LEHMAN

*Commissioner of Patents and Trademarks*